(12) United States Patent
Zhu

(10) Patent No.: US 8,223,484 B2
(45) Date of Patent: Jul. 17, 2012

(54) COVER MECHANISM AND ELECTRONIC DEVICE USING SAME

(75) Inventor: Guang-Ya Zhu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 203 days.

(21) Appl. No.: 12/755,500

(22) Filed: Apr. 7, 2010

(65) Prior Publication Data

US 2011/0069429 A1 Mar. 24, 2011

(51) Int. Cl.
*G06F 1/16* (2006.01)
*H04B 1/38* (2006.01)
*H01R 13/44* (2006.01)

(52) U.S. Cl. ............... 361/679.56; 361/679.01; 439/135; 455/90.3

(58) Field of Classification Search ............ 361/679.01, 361/679.4, 679.56–679.57; 439/135–150
See application file for complete search history.

(56) References Cited

U.S. PATENT DOCUMENTS

| | | | |
|---|---|---|---|
| 6,991,490 B1 * | 1/2006 | Su | 439/521 |
| 7,083,439 B1 * | 8/2006 | Hayakawa et al. | 439/136 |
| 7,189,084 B2 * | 3/2007 | Iikura | 439/135 |
| 2002/0006827 A1 * | 1/2002 | Ogata et al. | 463/43 |
| 2005/0124191 A1 * | 6/2005 | Stanton et al. | 439/135 |
| 2009/0130875 A1 * | 5/2009 | Guo | 439/141 |
| 2009/0141445 A1 * | 6/2009 | Lu | 361/679.55 |
| 2009/0270144 A1 * | 10/2009 | Yang et al. | 455/575.3 |
| 2010/0264671 A1 * | 10/2010 | Zuo | 292/57 |
| 2010/0309613 A1 * | 12/2010 | Zuo et al. | 361/679.01 |
| 2011/0032664 A1 * | 2/2011 | Long et al. | 361/679.01 |

FOREIGN PATENT DOCUMENTS

KR 442107 Y1 * 10/2008

* cited by examiner

*Primary Examiner* — Zachary M Pape
(74) *Attorney, Agent, or Firm* — Altis Law Group, Inc.

(57) ABSTRACT

A cover mechanism is for an electronic device, and the cover mechanism includes a base member and a cover member. The base member defines a hole and a receiving groove. The cover member is received in the receiving groove. The connecting arm extends through the base member and is latched with another side of the base member. The connecting arm is elastically bent to allow the cover portion to cover the hole.

12 Claims, 8 Drawing Sheets

COVER MECHANISM AND ELECTRONIC DEVICE USING SAME

BACKGROUND

1. Technical Field

The present disclosure relates to cover mechanisms used in electronic devices (e.g., mobile phones).

2. Description of Related Art

Electronic devices usually have external interfaces (e.g., universal serial bus (USB)) for electrically connecting peripheral devices (e.g., printers), accessories (e.g., USB flash drives) or other electronic devices. Such external interfaces should be protected by cover mechanisms from e.g., dust or water, to maintain proper functioning.

The cover mechanisms usually include covers with locks. The covers are typically locked to the electronic devices by latches to cover the area through which the interfaces of electronic devices are exposed. However, the covers are often not permanently attached to the electronic device. Thus, the covers may easily be misplaced or lost when not locked to the electronic devices.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present cover mechanism. Moreover, in the drawings, like reference numerals designate corresponding parts throughout the several views, in which.

DETAILED DESCRIPTION

Figure 1:
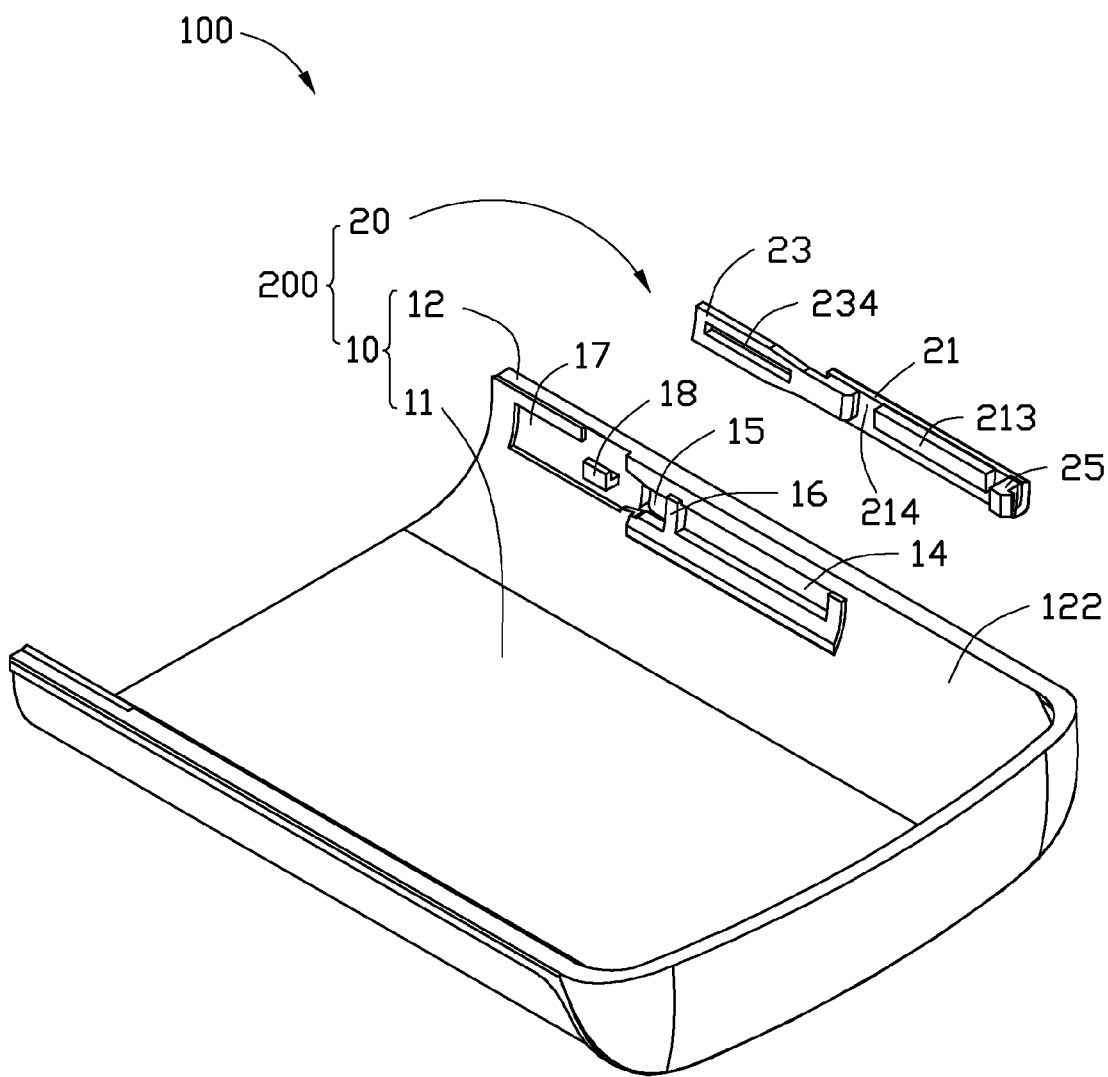
FIG. 1 is an exploded, isometric view of an exemplary cover mechanism used in an electronic device.
Figure 2:
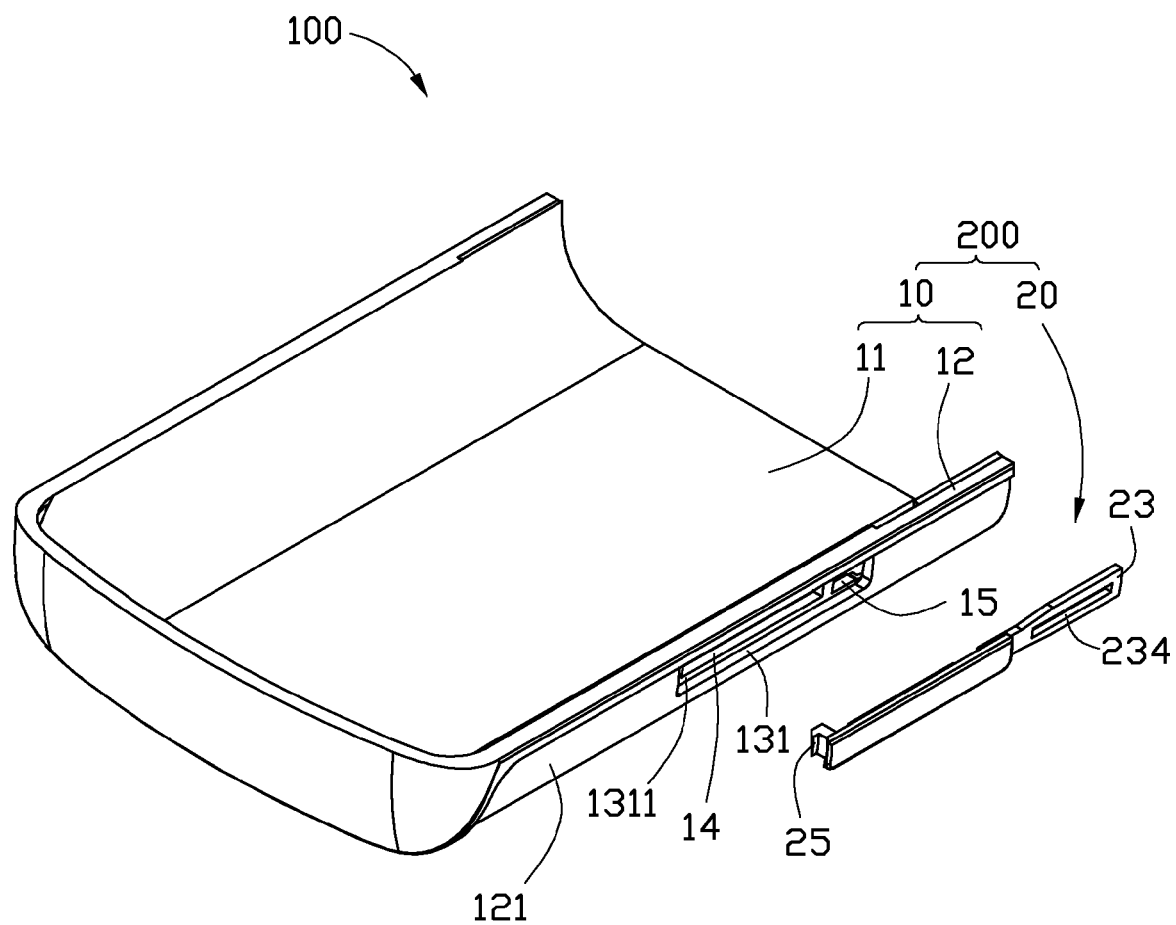
FIG. 2 is similar to FIG. 1, but shown from another aspect.

FIGS. 1 and 2 show an exemplary embodiment of a cover mechanism 200 used to an electronic device 100, such as a mobile phone.

The cover mechanism 200 includes a base member 10 and a cover member 20. The base member 10 may be portions of the electronic device 100 and includes a bottom wall 11 and a sidewall 12 perpendicular to the bottom wall 11. The sidewall 12 includes an outer surface 121 and an inner surface 122. The outer surface 121 of the sidewall 12 defines a receiving groove 131 with a bottom surface 1311. The bottom surface 1311 defines a through hole 14 and a latching hole 15. A rib 16 is formed on the bottom surface 1311 between the through hole 14 and the latching hole 15. In this embodiment, the hole 14 is a connector interface hole. The inner surface 122 defines a slot 17 and an L-shape hook 18 is formed in the slot 17. The slot 17 is adjacent to the latching hole 15.

The cover member 20 is made of two different materials by double-shot molding, and includes a cover portion 21 and an connecting arm 23. The cover portion 21 is made of hard plastics, and is configured to be received in the receiving groove 131 of the base member 10 and cover the through hole 14. A filler block 213 and a clasp 25 are formed on the cover portion 21 at one side thereof. The filler block 213 is configured for being inserted into the through hole 14. The clasp 25 is disposed at one end of the cover portion 21. The connecting arm 23 is made of flexible and elastic material such as rubber and soft plastics. The connecting arm 23 is parallel to the cover portion 21, and ends of the connecting arm 23 and the cover 21 are integrally formed together. A space 214 is defined between the connecting arm 23 and the filler block 213. The connecting arm 23 defines a cutout 234 for receiving the hook 18. The connecting arm 23 has a large elasticity allowing the cover member 20 to bend along the connecting arm 23.

Figure 3:
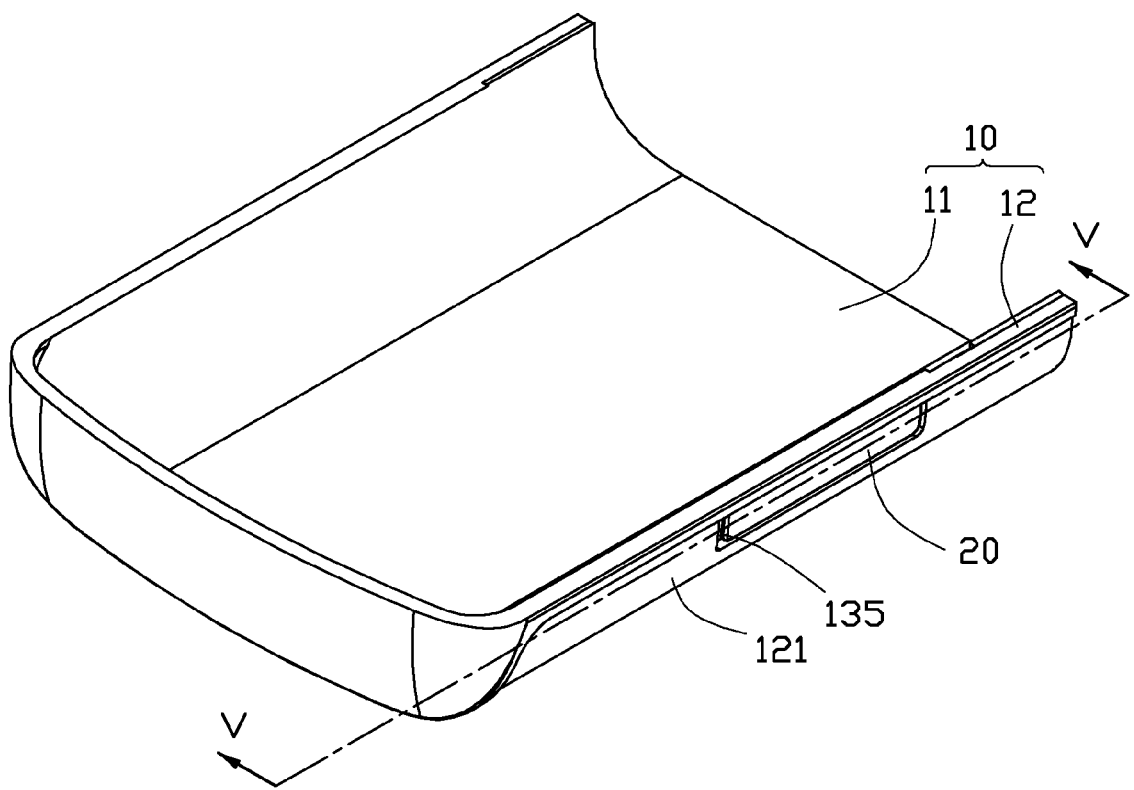
FIG. 3 is a partially assembled, isometric view of the exemplary cover mechanism shown in FIG. 1.
Figure 4:
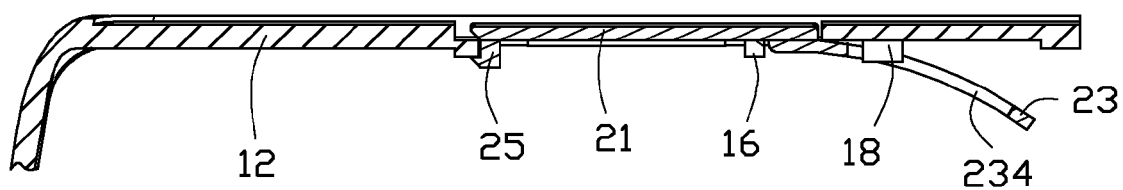
FIG. 4 is a cross sectional view of the cover mechanism shown in FIG. 3 taken along line V-V, showing the cover portion assembled to the base member and the connecting arm turned relative to the cover portion.
Figure 5:
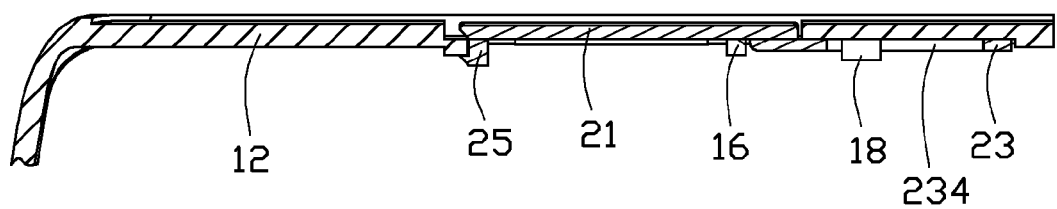
FIG. 5 is similar to FIG. 4, but showing the connecting arm latched to the base member in the closed position.
Figure 6:
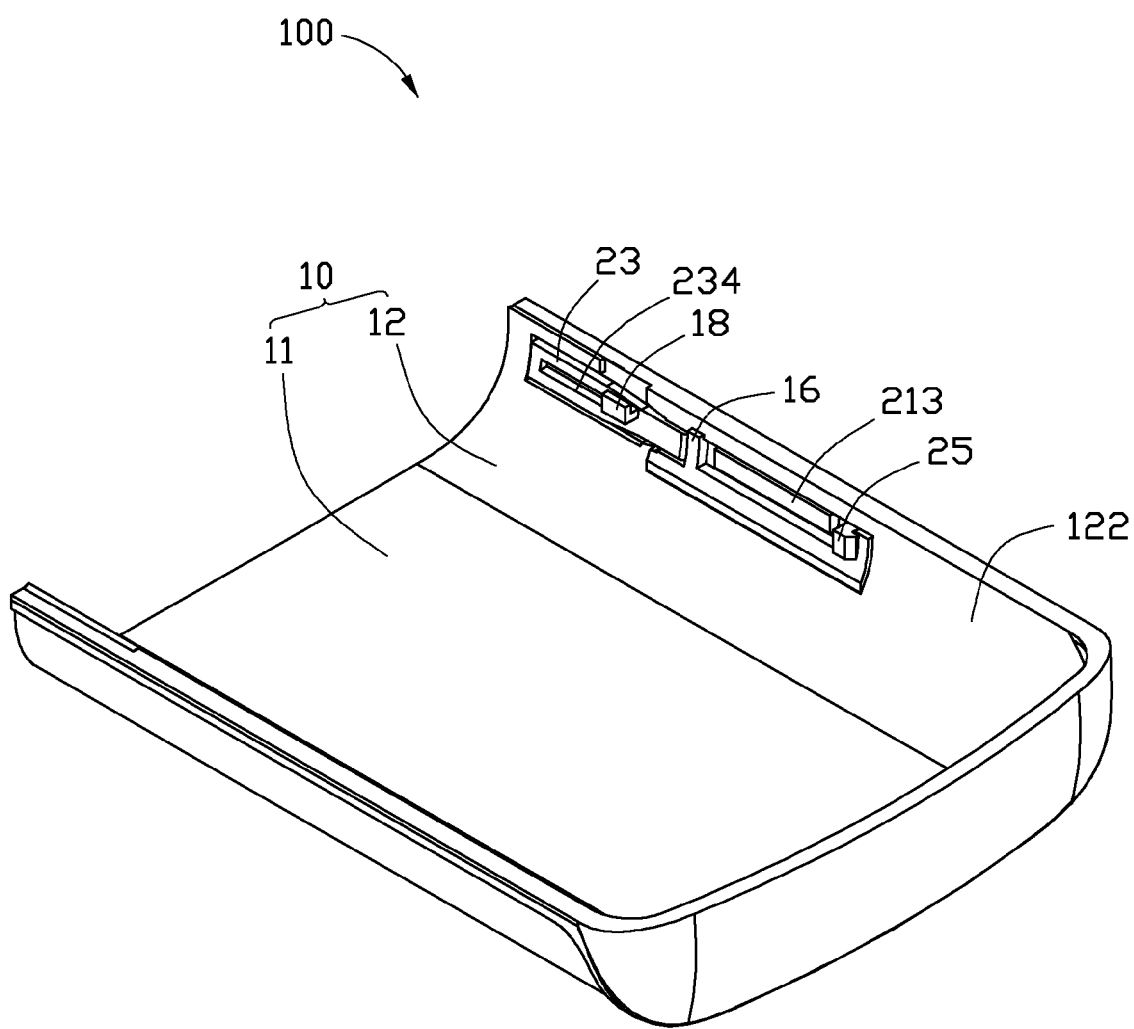
FIG. 6 is an assembled isometric view of the exemplary cover mechanism showing from an inside thereof.

In FIGS. 3 and 4, when the cover member 20 is assembled to the base member 10, firstly, the connecting arm 23 is inserted into the latching hole 15. The cover portion 21 is exposed from the outer surface 121. Since the connecting arm 23 has elasticity, one portion of the connecting arm 23 is deformed to allow the cover portion 21 to cover the receiving groove 131. The filler block 213 of the cover portion 21 is aligned with the hole 14 of the base member 10, and is then pressed into the hole 14. The clasp 25 deformedly passes through the hole 14 and latches the sidewall 12 of the base member 10 for fixing the cover member 20 to the base member 10. In FIGS. 5 and 6, the connecting arm 23 is flexibly received into the slot 17. The hook 18 is slidably latched into the cutout 234. A gap 135 is defined between one end of the cover portion 21 and the receiving groove 131. Thus, the cover member 20 is completely received in the receiving groove 131, and covers the through hole 14.

Figure 7:
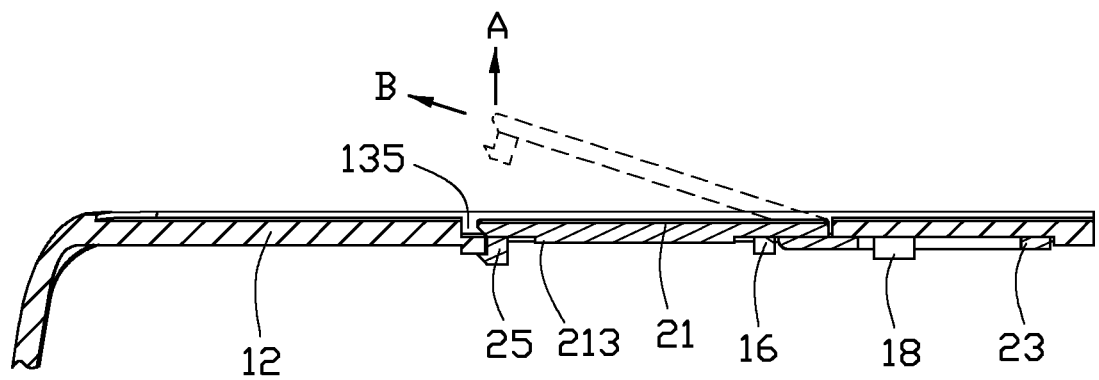
FIG. 7 is similar to FIG. 4, but showing the connecting arm latched to the base member showing how to open the cover portion.
Figure 8:
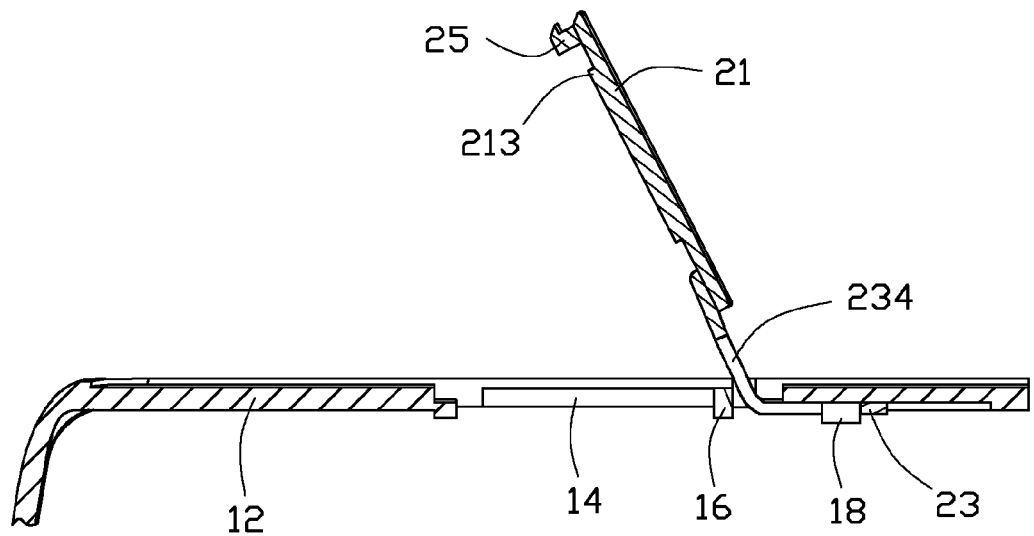
FIG. 8 is similar to FIG. 7, but showing the connecting arm latched to the base member in the open position.

When the cover member 20 is to be opened, as shown in FIG. 7, the operator may grip the end of the cover portion 21 near the gap 135 to pull the cover member 20 (direction of Arrow A). After the filler block 213 is separated from the hole 14, portions of the connecting arm 23 may be pulled out (direction of Arrow B) until the hook 18 is latched with the distal end of the cutout 234. Therefore, as shown in FIG. 8, the through hole 14 is exposed from the base member 10 for insertion of one of various kinds of plugs.

To close and lock the cover mechanism 200, the above process is reversed and the cover member 20 moved from the opened position to the closed position. The closing process ends when the cover portion 21 latches the sidewall 12.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover mechanism for an electronic device, the cover mechanism comprising:

a base member including a sidewall with an outer surface and an inner surface parallel to each other, the outer surface defining a latching hole and a through hole, a rib formed between the though hole and the latching hole, the inner surface defining a hook;

a cover member including a cover portion and a connecting arm parallel to each other, the connecting arm defining a cutout, the cover portion being plugged in the though hole, the connecting arm extending through the latching hole and the hook slidably latched in the cutout; the connecting arm elastically bends to allow the cover portion to cover or expose the hole.

2. The cover mechanism as claimed in claim 1, wherein the cover member is made of two different materials by double-shot molding.

3. The cover mechanism as claimed in claim 1, wherein a filler block is formed on the cover portion at one side thereof, the filler block is inserted into the through hole.

4. The cover mechanism as claimed in claim 1, wherein a clasp is formed on the cover portion at one side thereof, the clasp is latched with the base member.

5. The cover mechanism as claimed in claim 1, wherein the connecting arm is made of flexible and elastic material.

6. The cover mechanism as claimed in claim 1, wherein the inner surface defines a slot, the slot is adjacent to the latching hole, the hook is L-shaped, and is formed in the slot.

7. An electronic device, comprising:

a housing;

a cover mechanism, comprising:

a base member being a portion of the housing, the base member including an outer surface and an inner surface, the outer surface defining a latching hole and a though hole, a rib formed between the though hole and the latching hole, the inner surface defining a hook; and a cover member including a cover portion and a connecting arm integrally formed together, the connecting arm defining a cutout, the cover portion being substantially parallel to the connecting arm, the connecting arm extending through the latching hole, and slidably being attached to the hook of the electronic device and allowing the cover portion to be elastically bent relative to the connecting arm to cover the through hole.

8. The electronic device as claimed in claim 7, wherein the base member define a receiving groove, the cover portion is received in the receiving groove.

9. The electronic device as claimed in claim 7, wherein the cover member is made of two different materials by double-shot molding.

10. The electronic device as claimed in claim 7, wherein a filler block and a clasp are formed on the cover portion at one side thereof, the filler block is inserted into the through hole, and the clasp is latched with the base member.

11. The electronic device as claimed in claim 7, wherein the connecting arm is made of flexible and elastic material.

12. The electronic device as claimed in claim 7, wherein the inner surface defines a slot, the slot is adjacent to the latching hole, the hook is L-shaped, and is formed in the slot.

* * * * *